Jan. 15, 1963  A. A. GRIFFITH  3,073,549
JET LIFT VERTICAL TAKE-OFF AIRCRAFT
Filed Sept. 8, 1961  7 Sheets-Sheet 3

Inventor
Alan Arnold Griffith
By
Cushman, Darby & Cushman
Attorneys

Jan. 15, 1963  A. A. GRIFFITH  3,073,549
JET LIFT VERTICAL TAKE-OFF AIRCRAFT
Filed Sept. 8, 1961  7 Sheets-Sheet 6

Inventor
Alan Arnold Griffith
By
Cushman, Darby & Cushman
Attorneys

Jan. 15, 1963 A. A. GRIFFITH 3,073,549
JET LIFT VERTICAL TAKE-OFF AIRCRAFT
Filed Sept. 8, 1961 7 Sheets-Sheet 7

Inventor
Alan Arnold Griffith
By
Cushman, Darby & Cushman
Attorneys

United States Patent Office

3,073,549
Patented Jan. 15, 1963

3,073,549
JET LIFT VERTICAL TAKE-OFF AIRCRAFT
Alan A. Griffith, 150 Alexandra Road,
Farnborough, England
Filed Sept. 8, 1961, Ser. No. 136,836
Claims priority, application Great Britain Sept. 13, 1960
10 Claims. (Cl. 244—12)

This invention is concerned with jet lift vertical take-off aircraft.

In aircraft equipped with lifting jets for vertical take-off and landing and intended for short or medium range operation, wide span wings which are primarily necessary for runway take-off and landing are not required. It would be advantageous to dispense with such wings, so as to reduce the weight of the aircraft and the drag acting on it, and to rely on the body of the aircraft for aerodynamic support in cruising flight. In conventional winged aircraft having relatively slender bodies, such aerodynamic lift that acts on the body, i.e. when it moves forwardly through ambient air at a relatively upwardly inclined angle of incidence, is low due to air flow round the body from the high-pressure region below the aircraft to the low-pressure region above the aircraft. This flow diminishes the lift available at a given angle of incidence and also greatly increases the drag through the formation of a pair of powerful trailing vortices.

According to the present invention, there is provided a jet lift vertical take-off aircraft which includes means for producing a pair of downwardly directed jets having elongate transverse cross-sections which extend substantially parallel to the longitudinal axis of the aircraft and which are longer than half the length of the aircraft, the jets being unbroken along their transverse extents, and emerging from the aircraft at locations which are laterally spaced apart, and which are wholly below the transverse horizontal median plane of the aircraft and adjacent the underside thereof, the jets forming lateral boundaries of a substantial area of the underside of the aircraft and inhibiting flow of ambient air laterally and upwardly from said area round the aircraft, whereby the jets provide jet lift for the aircraft, and increase the aerodynamic lift acting on the aircraft when the latter moves forwardly through ambient air at a relatively upwardly inclined angle of incidence.

The word "jets" is used in this specification to mean gaseous jets which include exhaust gases produced by burning a fuel, e.g. in a gas turbine engine.

It is essential, in order for the jets to be most effective in inhibiting said lateral air flow, that the jets should emerge from the aircraft below the transverse horizontal median plane thereof. Aircraft with which the present invention is concerned will normally have bodies of comparatively large size, and if the jets emerge from the aircraft above the transverse horizontal median plane thereof, by the time they reach the level of the underside of the aircraft, they will have diffused and their velocity will have fallen, so that they do not form a particularly effective barrier preventing spillage of air from the area which is beneath the underside of the aircraft and which is laterally bounded by said jets. Also, in order for the jets to form effective barriers, they must be unbroken along their transverse extents, and they must extend for longer than half the length of the aircraft in order to provide a substantial increase in the aerodynamic lift acting on the aircraft. In addition to increasing the aerodynamic lift acting on the aircraft, the jets have the further advantage that they reduce the drag on the aircraft when it is moving forwardly through ambient air at a relatively upwardly inclined angle of incidence, the aircraft producing trailing vortices which are less powerful than if the jets are omitted.

Although the jets can emerge from the aircraft above the level of the underside thereof, the jets are more effective if each emerges from the aircraft through jet nozzle means which extends below the level of the underside of the aircraft, the two jet nozzle means defining with the underside of the aircraft therebetween an inverted channel opening vertically downwards.

The aircraft can be constructed without wings, said jets emerging on the port and starboard sides of an elongated fuselage of the aircraft. The elimination of conventional wings permits an increase in the percentage payload of the aircraft.

It will be appreciated that during forward flight of the aircraft, the pressure in the area bounded by the jets will tend to increase as the relative angle of incidence of the aircraft increases. Thus the jets will become less effective as a barrier to lateral air flow from said area. The effectiveness of the jets in opposing the lateral air flow can be regarded as depending on the ratio of jet lift to aerodynamic lift, and there is an optimum ratio which, for the case when the aircraft is cruising, is thought to be of the order of 30% jet lift to 70% aerodynamic lift. Preferably, therefore, the aircraft is designed to cruise with the jets producing a jet lift on the aircraft of the order of 30% of the total lift. The design considerations of the aircraft will of course include the aircraft engines which provide the jets and forward propulsion of the aircraft, and the aerodynamic profile of the aircraft.

Preferably, the aircraft includes means for varying the direction of emergence of the jets from the aircraft. Thus the jets may be directed forwardly, transversely or rearwardly of the aircraft, and the direction of emergence may vary along the length of each jet. When, for example, the gases comprising the jets are accelerated rearwardly of the aircraft, a forward thrust will be exerted on the aircraft, which may be supplemented if desired by the use of additional jet engines of pure jet or turbo-prop type, to provide forward propulsion of the aircraft.

Preferably also, the aircraft includes means for varying the width of each jet. Thus the mass flow of gases forming one jet may be made greater than the mass flow of gases forming the other jet, and the width of each jet may be varied along the length thereof. Thus the aircraft may include, for each jet, three walls for dividing the jet longitudinally into two parallel sections, closure means being provided for selectively opening and closing the passage between two adjacent ones of said walls to the flow therethrough of the jet gases, so that the total jet width can be made greater for cruising than for take-off. The closure means may comprise for example one or more pivoted flaps.

The aircraft may include gas turbine engine means which drive ducted air impeller means located in a forward-looking air intake of the aircraft, the jets comprising a mixture of the gas turbine exhaust gases and air impelled by the impeller means, said impeller means being connected to the gas turbine engine means by one or more free wheel devices so that, in the event of engine failure, the impeller means is free to windmill. The ducted air impeller means may be a single or multi-stage axial compressor or ducted fan unit, each stage of the multi-stage arrangement preferably being driven by different engines so as to provide a safety factor in the event of engine failure. The impeller means may utilise blades of variable pitch, and the blades may be made of plastic material and comprise a hollow fibre-glass plastic shell filled with foamed plastic resin.

Preferably the aircraft includes means adapted to form a peripheral skirt extending round the underside of the aircraft, the jets being discharged within the boundary of the skirt and forming a gaseous cushion supporting the aircraft when the latter is close to the ground. The aircraft can be made to take-off with a considerable overload, by first lifting the aircraft off the ground on said gaseous cushion, and then causing the aircraft to move forwardly until sufficient aerodynamic lift is available to enable the aircraft to complete its take-off.

The main advantage of the aircraft is that it can take-off and land relatively quietly compared with conventional jet aircraft, and is therefore much more suitable for operation from city centres, and is likely to be quiet enough to satisfy civic authorities concerned with noise abatement. The aircraft requires rather more power for economical cruising at high subsonic speed than during a quiet take-off, but the extra power which the engines of the aircraft can provide for cruising is available during take-off if desired. With the aircraft, it is possible to take advantage of the economy at high altitude cruise over much shorter stage lengths than is possible with conventional turbo-propeller aircraft.

The invention will be further described by way of example only with reference to the accompanying drawings in which.

Figure 8:
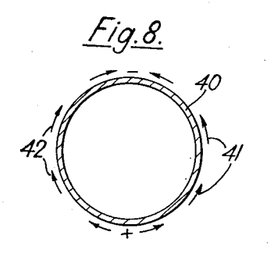
FIGURES 8 and 9 diagrammatically illustrate the principles of the invention.
Figure 9:
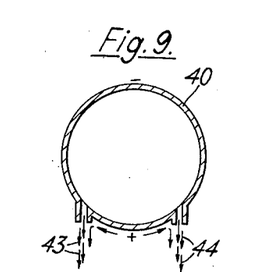

In FIGURES 8 and 9 the principle of the invention is illustrated. The aircraft fuselage 40 is shown diagrammatically.

When the aircraft is airborne and the fuselage is moving forwardly through ambient air at a relatively upwardly inclined angle of incidence, there is an area of positive pressure underneath the fuselage and an area of negative pressure above the fuselage.

The difference in pressure causes an air flow to take place as indicated by arrows 41 and 42 from the area of positive pressure to the area of negative pressure.

As previously mentioned this has a detrimental effect on the lift and drag of the aircraft.

In FIGURE 9, two longitudinal jets issue from the underside of the fuselage, as indicated by the arrows 43, 44. These jets, in effect, form downwardly projecting barriers on either side of the area of positive pressure, and inhibit air flow from positive to negative pressure areas. This increases the aerodynamic lift acting on the fuselage. The theory of an aircraft having such jets according to the present invention, is discussed later in this specification.

Figure 1:
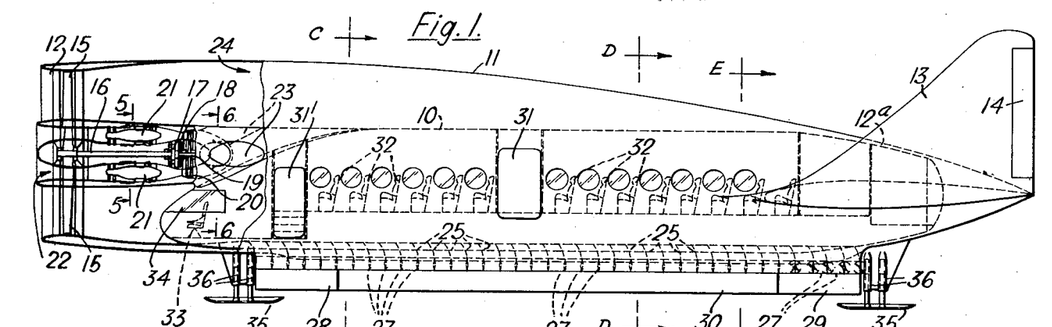
FIGURE 1 is a side elevation of a jet lift V.T.O. aircraft embodying the invention.
Figure 7:
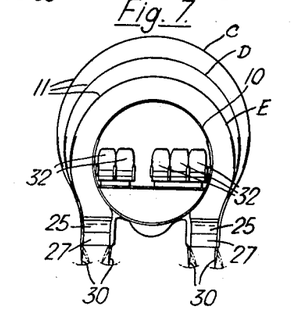
FIGURE 7 is a developed view showing a number of sections C, D, and E taken on lines C—C, D—D and E—E on FIGURE 1.

Reverting now to FIGURE 1, this figure shows an aircraft comprising a cabin 10 which is pressurized and is of circular section (see FIGURE 7).

The cabin is supported within a shell 11 which has its front end 12 open. The rear end of the shell 11 tapers as shown at 12a and is bounded by a pair of vertical fins 13 (FIGURE 4) including pivoted control fins 14.

Figure 5:
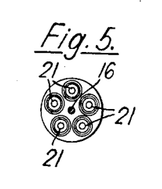
FIGURE 5 is a section on line 5—5 of FIGURE 1.

At the front end of the aircraft there is a large fan 15 mounted on a shaft 16 driven through multiple reduction gears 17 and a clutch 18 by the shaft 19 of a free turbine 20. The turbine 20 is rotated by the exhaust gases of five small gas turbine engines 21 (FIGURES 1 and 5). The air intakes 22 of the five engines pass through the hub of the fan 15.

The air propelled rearwards by the fan 15 is mixed with the exhaust gases of the engines 21, which exhaust gases pass through passages 23 into the propelled air 24.

Figure 2:
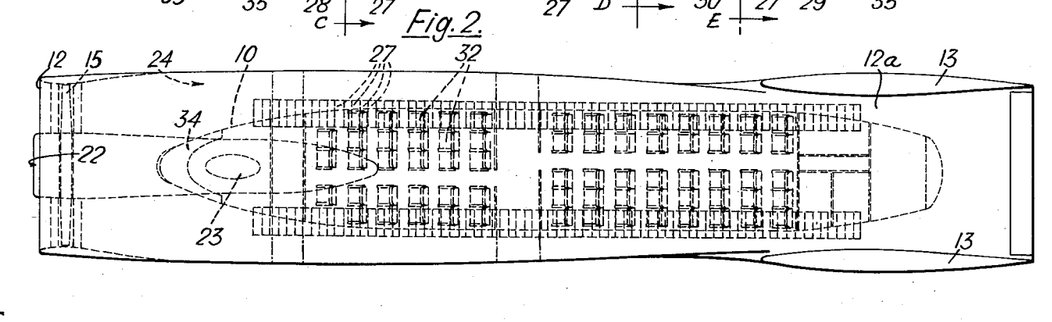
FIGURE 2 is a plan of the same aircraft.
Figure 3:
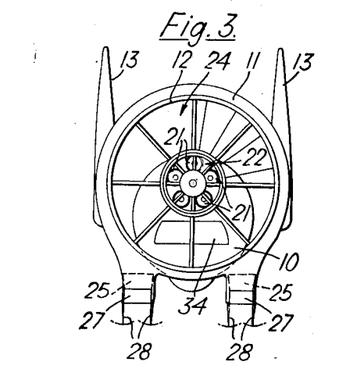
FIGURE 3 is a front end elevation of the same aircraft.

The mixture of air and exhaust gases (the air being a very major proportion of the total) is then directed downwardly by the shell 11 on both sides of the cabin 10, and passes into two sets of fixed curved guide vanes 25 (FIGURES 1 and 2).

Each set of curved guide vanes lead into another set of pivoted deflector vanes 27, which in turn lead into a series of pivoted lateral deflector vanes 28 and 29 and fixed vanes 30, the vanes 28–30 terminating below the level of the underside of the fuselage. The gases propelled through these vanes form a pair of elongated downwardly directed jets which extend over the greater part of the length of the aircraft and which are spaced apart to form lateral boundaries of a substantial area of the underside of the aircraft fuselage.

The deflector vanes 27 can be moved in either direction from the position shown so as to give the jet gases a component of forward or rearward motion as desired, and the lateral deflector vanes 28 and 29 (shown more clearly in FIGURES 1 and 4) can be moved either simultaneously in the same direction or in opposite directions so as to deflect the gases transversely to the right or left as required or to vary the flow of gases through the vanes.

The aircraft cabin 10 is provided with two doors 31 and 31' and a number of rows of seats 32 of conventional type.

The pilot's seat is also shown diagrammatically at 33 and it will be seen that the pilot's eyes are positioned such that, looking forward through a transparent panel 34, he can see through the rotating fan 15.

The passengers can also see through the wall of the cabin 10 and the shell 11 which can be made of suitable transparent fibre glass or other resinous material.

The aircraft is equipped with skids 35 supported in shock absorbing mountings 36.

Figure 6:
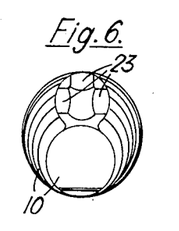
FIGURE 6 is a section on line 6—6.

The cabin 10 is substantially circular in cross section throughout its length except for the forward portion where the pilot is accommodated, the shape being shown in FIGURE 6.

Figure 4:
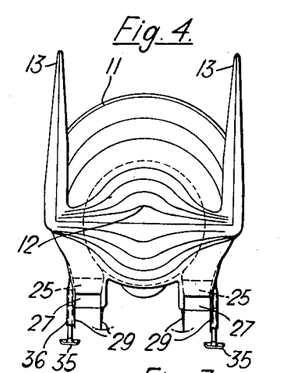
FIGURE 4 is a rear end elevation.

The shape of the outer skin 11 can best be seen from FIGURES 1, 2 and 4 and from the sections C, D and E in FIGURE 7.

The operation of the aircraft is as follows:

To take-off, the engines 21 are started and their exhaust gases drive the free turbine 20 which, through the clutch 18 and gearing 17, drives the shaft 16 on which is mounted fan 15. The fan preferably consists of sixteen large rotor blades, and has a maximum tip speed of 750 ft./per second, so that it does not generate much noise in operation.

The air propelled rearwardly by fan 15 mixes with the exhaust gases from the gas turbine engines 21 and the flow of air proceeds round the outside of the cabin 10 and is diverted into two downwardly moving streams which pass out through the curved guide vanes 25 and the other vanes 27 to 30 to form two long continuous jets parallel to and on either side of the longitudinal axis of the aircraft, and emerging from the aircraft below the level of the underside of the fuselage. These jets act as a pair of barriers so as to increase the aerodynamic lift acting on the underside of the aircraft.

The aircraft can either take off vertically, or the vanes 27 can be moved so as to give the jets a rearward velocity component, in which case the aircraft is given a forward thrust which enables it, as soon as it leaves the ground, to move forwardly and to take off in a sharp climb.

When the aircraft is moving forwardly, the relatively large surface of the underside of the aircraft between the barrier jets provides aerodynamic lift which can become sufficient to support the aircraft in forward flight. By deflecting the vanes 27 so as to increase the rearward velocity component of the jet gases, the component of forward velocity of the aircraft is increased until cruising speed is reached.

The vanes 27 at the rear end and the vanes 27 at the front end of the aircraft can be adjusted differentially.

Also, the vanes 28 and 29 can be moved differentially. Thus the vanes 27–29 can either be used to increase the thrust at one end or one side of the aircraft, or to achieve a combination of change in direction of deflection and degree of thrust so as to produce a required controlling effect on the position of the aircraft. Thus for example the pitch of the aircraft can be varied by operating the vanes 27 differentially at the front and rear of the aircraft, or by operating the vanes 28, 29 differentially, e.g. so that the total jet width passing through the vanes 29 is less than the total jet width passing through the vanes 28. The vanes 28, 29 can also be operated to control the roll and yaw of the aircraft in a variety of ways which it is believed will be readily apparent.

Additionally turning movement of the aircraft can be produced by the fins 14 if desired.

If one of the engines 21 fails, the remaining engines continue to drive the turbine 20. If all the engines fail the clutch 18 permits the fan 15 to windmill. If the aircraft has a forward component of motion when all the engines fail, the fan 15 will windmill and the ram air directed into the downward jets will be sufficient to cause the aircraft to make a forced landing at about 120 knots and to come down on a cushion of jet air, landing on the skids. Normally, landings will be done vertically in which case the skids merely act as legs to support the aircraft on the ground.

Figure 10:
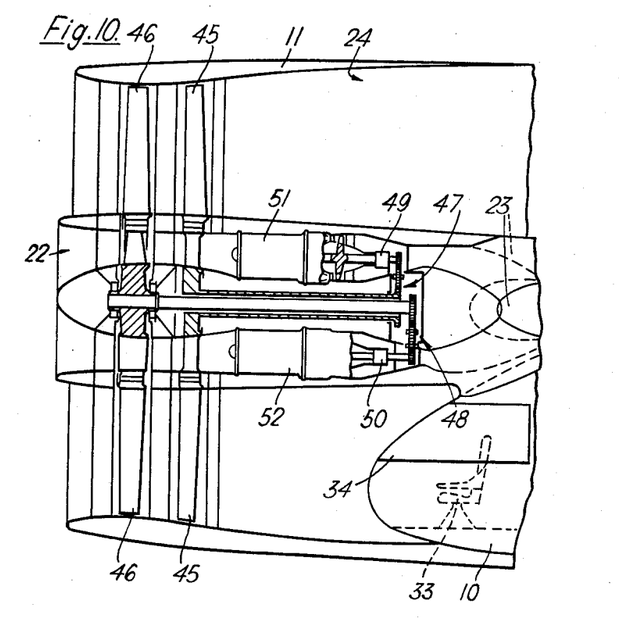
FIGURE 10 shows diagrammatically an alternative embodiment of the invention using gas turbine engines providing a direct shaft horse power output.

FIGURE 10 shows diagrammatically another way of providing power for the air impeller means of the aircraft. In this case there are two large fans 45 and 46 which are driven in contrary directions of rotation by trains of gears 47 and 48 driven through one way clutches 49 and 50 by a pair of gas turbine engines 51 and 52 respectively, which provide the necessary shaft output horse power. In this arrangement, if the engine 51 fails, the other engine 52 will continue to drive its associated fan 46.

Figure 11:
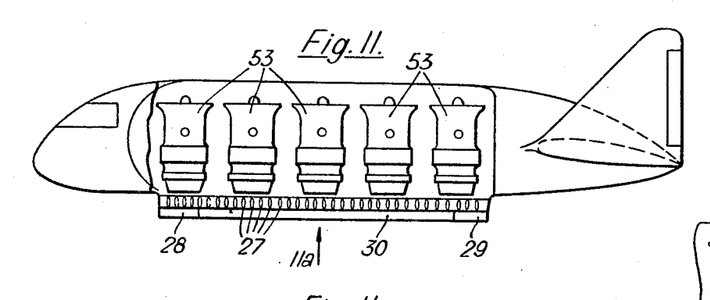
FIGURE 11 shows an alternative form of the invention using tiltable small gas turbine engines.
Figure 11A:
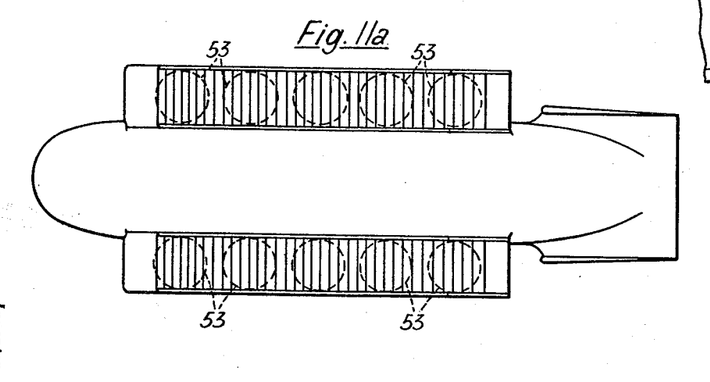
FIGURE 11a is a view in the direction of arrow 11a shown on FIGURE 11.

In FIGURES 11 and 11a is shown an arrangement in which there is no fan at the front end of the aircraft, but instead there are ten small gas turbine engines 53 which are arranged to direct their outputs downwardly and which are pivotally mounted so that they can be tilted to give a rearward velocity component to the jets. The engines might for example direct the jets rearwardly at an angle of 70° to the vertical, and a further 10/20° deflection to the vertical may be provided by the deflector vanes 27 as described with reference to FIGURE 1.

Figure 12:
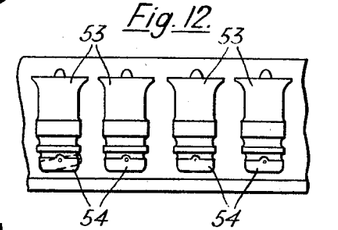
FIGURE 12 is a diagram similar to FIGURE 11 in which the small gas turbine engines are fixed but are provided with tiltable final nozzles.

Alternatively the gas turbine engines 53 can terminate in variable direction nozzles 54 as shown in FIGURE 12, in which case the engines 53 are fixed, the jets being deflected merely by altering the positions of the nozzles 54.

In these two embodiments of the invention, although the individual gas turbine engines supply separate exhaust gas streams, these streams coalesce as they pass through the vanes 27 to 30, so that when the two jets emerge from the vanes 27 to 30, they are each, in effect, continuous along their transverse cross-sections.

Figure 13:
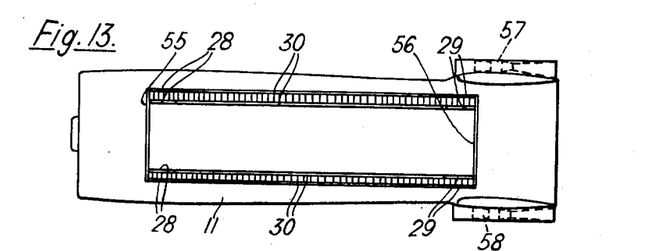
FIGURE 13 shows an alternative layout of the aircraft with forward propulsion engines and flaps for closing the boundary of the area within the jet barriers.

In FIGURE 13 is shown an underplan of an aircraft which is similar to the one shown in FIGURES 1 and 2, except that it has flaps 55 and 56 which can be moved into position to complete the curtaining of the area under the fuselage lying between the longitudinal jet barriers. These flaps can be lowered when it is desired to make full use of ground effect. For example to take-off with an overloaded aircraft, the flaps would be lowered and the ground effect used to raise the aircraft clear of the ground. Then the aircraft could be moved forwardly, by deflecting the longitudinal jets, until its forward speed was sufficient to give some aerodynamic lift, after which the take-off could proceed normally. The flaps 55 and 56 would be returned to their inoperative positions once the aircraft no longer relied on the ground effect. The aircraft shown in FIGURE 13 also has forward propulsion jet engines 57 and 58 which can either be single engines or in vertical banks of two or more engines.

Figure 14:
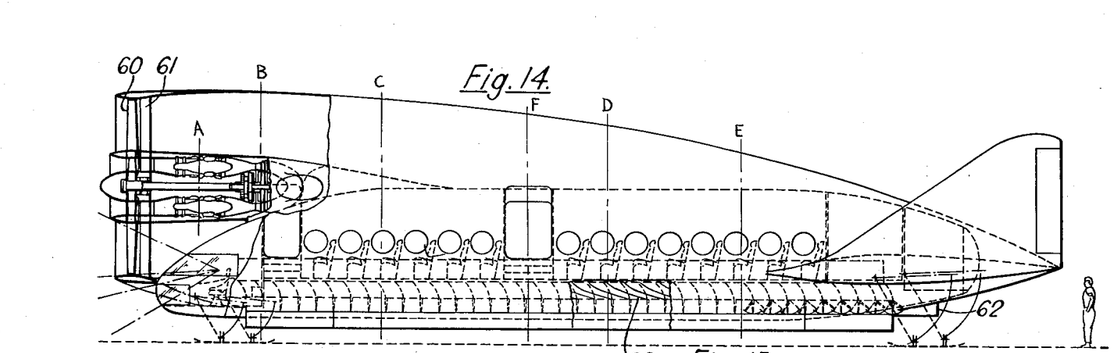
FIGURE 14 is a diagrammatic section through another aircraft embodying the invention.

The aircraft shown in FIGURE 14 is very similar to the aircraft shown in FIGURES 1 and 2, and only the differences will be described in detail. It will be seen from FIGURE 14 that the compressor 60 is overhung, i.e. there is no impediment in front of it to interfere with the axial symmetry. There is only one compressor shown. The compressor 60 has, behind it, a row of fixed reaction vanes 61.

A further difference can be seen best in FIGURES 17–24 inclusive. The longitudinal jets are formed by vanes 63 and 64 which act as nozzles on each side of the aircraft. The jets are divided into two longitudinal sections by dividing walls 65 and 66. At the upper end of each dividing wall 65 and 66 is a pivoted series of flaps 67. It has been found that the aircraft requires a greater effective jet width for cruise than for take-off. Therefore for take-off the effective jet width is decreased by putting flaps 67 to the positions shown in full line in FIGURE 17 so that the jet gases flow wholly through the pair of nozzles formed by the vanes 63, 64. For cruise, the flaps 67 are moved to the dotted line positions so as to increase the effective width of the jets.

Figure 15:
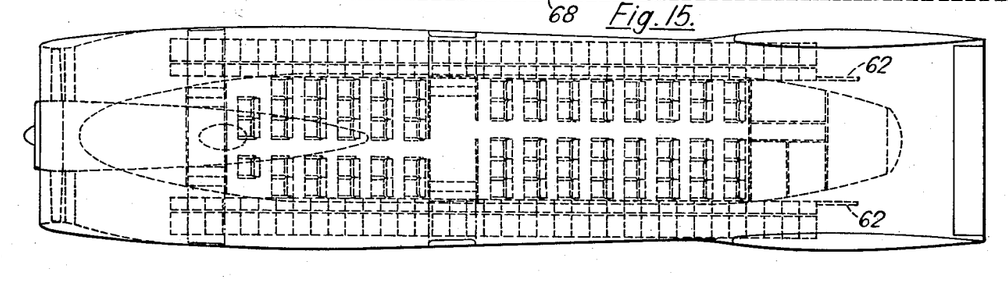
FIGURE 15 is a plan view of the same aircraft.
Figure 16:
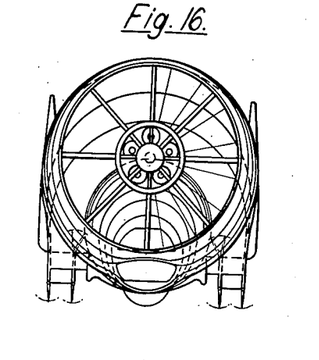
FIGURE 16 is a front view of the aircraft.
Figure 17:
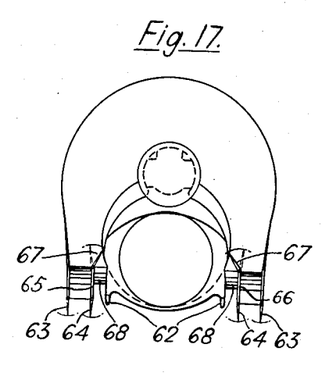
FIGURE 17 is a section on line B shown in FIGURE 14.
Figure 18:
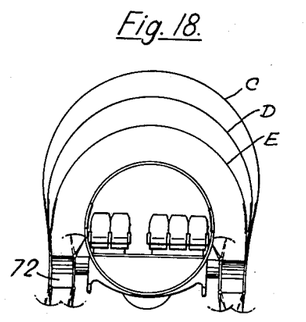
FIGURE 18 represents three different sections on lines C, D and E of FIGURE 14.
Figure 19:
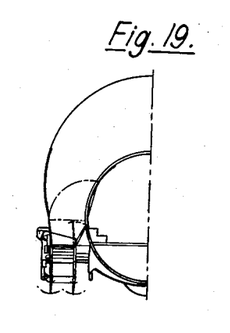
FIGURE 19 is a half section on line F of FIGURE 14.
Figure 20:
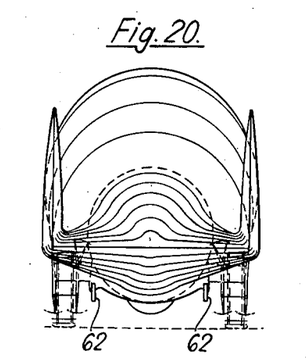
FIGURE 20 is a rear view of the aircraft.
Figure 21:
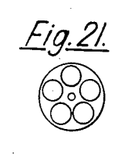
FIGURE 21 is a section on line A of FIGURE 14.

The gases flowing through the two passageways defined between the walls 65, 66 and the adjacent walls of the aircraft pass through deflector vanes 68 (see FIGURES 14 and 17), which direct these gases so that they have a relatively large rearward velocity component. The tendency of these gases to curve inwardly and follow the profile of the tail cone of the aircraft is countered by two triangular vanes 62 which are mounted as shown in FIGURES 14, 15 and 20.

Figure 22:
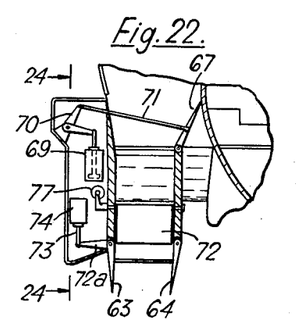
FIGURE 22 is an enlarged detail of FIGURE 19.
Figure 23:
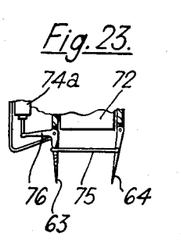
FIGURE 23 is a further enlarged detail.
Figure 24:
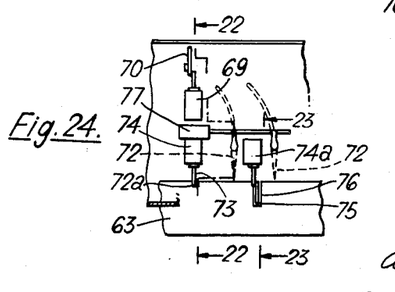
FIGURE 24 is an enlarged side elevation of the mechanism for moving flaps and vanes shown in FIGURE 22 with the outer cover removed.

The mechanism for moving the flaps 67 is shown in FIGURES 22 and 24. The mechanism consists of a number of hydraulic piston and cylinder devices 69 connected through pivoted bell crank levers 70 and links 71 to the flaps 67.

These figures also show the operating mechanisms for the jet deflecting vanes 63 and 64. These vanes and also vanes 72 (which deflect the jet rearwardly) are movable by a series of piston and cylinder, bellcrank, and lever arrangements.

In FIGURE 22 the deflector vane 63 forms one arm of a bell-crank lever, the other arm 72a of which is connected to the piston 73 of a piston and cylinder device 74. This arrangement is also shown in FIGURE 24.

The adjacent vane 64 is operated by a piston and cylinder arrangement 74a (FIGURE 24) operating through a link 75 (FIGURE 23) and bell crank lever 76. Thus the two vanes 63 and 64 can be operated independently of one another so as to increase the nozzle area or reduce it, and can also be operated simultaneously so as to deflect the jet sideways. The vanes 72 are movable by piston and cylinder devices 77 (FIGURES 22 and 24) so as to deflect the longitudinal jets rearwardly.

The remaining details of this aircraft are similar to the details of the aircraft shown in FIGURES 1 and 2.

For an aircraft according to the present invention, travelling at the best cruising speed and height, the total lift may comprise for example 70% body lift and 30% jet lift. Without the jets, it would not be feasible to take so much lift on the body of the aircraft because the induced flow round the body due to lift would follow relatively short paths from the lower to the upper surface of the body, with consequent low lift and high drag. The effect of the jets, however, is that the induced flow must follow much longer paths round the outer edges of the jets. In fact, according to a well known approximate rule, the effect on the lift slope and the drag acting on the aircraft due to lift is much the same as it would be if the aircraft were flat and extended in a horizontal plane in the form of wings. In the case of the jet wing, however, this analogy cannot be pushed too far, as will be seen later. It is, nevertheless, a good thing to make the jet length as large a proportion of the length of the aircraft body as is feasible, so as to obtain the greatest possible equivalent span from a given normal (or lifting) component of jet velocity.

The theory on which the aircraft according to the present invention has been developed is as follows:

Lift/Drag Ratio

The usual way of developing aerodynamic theory is first to consider the problem as one of the potential flow of an ideal fluid, and then to discuss the modifications introduced by viscosity, usually in a thin boundary layer.

To apply this method to the present aircraft, one should first reduce the problem to two dimensions by means of Ward's slender body assumption; one then has, for each cross-section normal to the line of flight, a problem in plane potential flow such as is usually solved by conformal transformation, or by an analogue. The special difficulty in the present case is that although velocity potentials exist for both the jets and the mainstream, they are different potentials. The boundaries between the two streams are not known beforehand, but are to be determined from the condition that the square of the velocity increases by a constant amount on passing from the mainstream to the jet. The problem has something in common with the problems of discontinuous motion solved by the method of Kirchoff, but it is more general and much more difficult.

In the absence of a solution along the foregoing lines, it is necessary to rely on approximate calculations and on experiment for the evaluation of the aerodynamic properties of the aircraft. In advance of experimental work, preliminary estimates may be made with the help of the well known approximation, that the effect of the jet wings on the induced drag is the same as if their actual span were their developed span, but in practice it is necessary to take the effective span to be less than that, to allow for the error of that approximation.

Let it be taken that:

$V$ = flight speed
$p$ = dynamic pressure
$S$ = external surface area of aircraft
$C_f$ = skin friction coefficient
$W$ = aircraft weight
$b$ = body span, measured between the midpoints of the width of the jet outlets
$m$ = ratio of true effective span to $b$
$x$ = ratio of jet lift to total lift
$y$ = ratio of lifting jet velocity to $V$
$D$ = total effective drag of aircraft Then for subsonic flight, $$\frac{D}{W} = \frac{\rho C_f S}{W} + \frac{W(1-x)^2}{\pi b^2 m^2 p} + 1/2xy \quad (1)$$

In this equation, the first term is the contribution of the profile drag whilst the second represents the induced drag of that part of the lift which is carried by the body. The third term arises from the net power absorbed in producing the lifting jets.

The optimum cruising height is to be derived from the best value of $p$, which is $$p = \frac{W}{\sqrt{\pi b^2 S C_f}} \cdot \frac{1-x}{m} \quad (2)$$

and with this value of $p$, Equation 1 becomes $$\frac{D}{W} = \frac{2n(1-x)}{m} + 1/2xy \quad (3)$$

where $$n^2 = \frac{C_f S}{\pi b^2} \quad (4)$$

To make further progress in locating the optimum lift/drag ratio it is necessary to estimate $m$, and especially its dependence on $x$ and $y$.

If $c$ be the effective root-chord of the jet wings, it should be noted in the first instance that the geometric spread of each jet wing is approximately $cy$, so that $$m \leqslant 1 + 2y\frac{c}{b} \quad (5)$$

It may be noted in passing that $c$ may be greater than the length of the jet opening for, aft of the jet, the gap between the jet-wing and the rearward end of the body can be closed to the jet wing by a triangular fin 62 as mentioned above.

Having arrived at an upper limit for $m$, a lower limit may be sought by considering the outward and upward bending of the jet-wing due to the pressure difference between the lower and upper surfaces of the body.

For the case where $1-x$ is small, so that the jet-wings are only slightly curved, an elementary argument gives:

$$\frac{R}{b} \approx 1/2\frac{x}{1-x} \quad (6)$$

where $R$ is the radius of curvature of the jet wings. For larger values of $1-x$, this formula gives too great a curvature, because the associated curvature of the induced flow pattern diminishes the pressure difference across the jet wings.

Nevertheless, it can be seen that, with $x$ very small, the jet wings are liable to be rolled up completely into the cores of the lift-vortices, notwithstanding that $y$ may be large. It may therefore be concluded that, in order that a given value of $y$ may be effective in increasing $m$, it should be associated with a sufficiently large value of $x$.

It should be noted that if Equation 6 applied and each wing were bent round to the form of a semicircle at the after end of the root chord, then $$m \approx 1 + \frac{\pi x}{1-x}$$

since the aforesaid approximation may be expected to be fairly close for this configuration, and, bearing in mind that Equation 6 gives too small a radius, one may reasonably replace the factor $\pi$ by, say 4. In order, however, that the geometric spread of the wing may be sufficient for the purpose, one must have in addition $$2y\frac{c}{d} \geq 4\frac{x}{1-x} \quad (7)$$

To be on the safe side, let the left hand side be, say 1.2 times the right hand side. This gives $$y = 2.4\frac{b}{c} \cdot \frac{x}{1-x} \quad (8)$$

and Equation 3 becomes $$\frac{D}{W} = \frac{2n(1-x)^2}{1+3x} + 1.2\frac{b}{c} \cdot \frac{x^2}{1-x} \quad (9)$$

With given values of $n$ and $$\frac{b}{c}$$

(which must be obtained from design studies) Equation 9 enables the optimum value of $x$, and hence the maximum lift/drag ratio to be found.

With $n = 0.12$ and $$\frac{b}{c} = 0.25$$

(values obtained from the first design study of a jet-wing aircraft) the best value of $x$ is about 0.3 and the maximum lift/drag ratio about 10. Bearing in mind that this is a first attempt, the figure obtained is very encouraging, being quite good enough for short aircraft stage lengths of up to about 1,000 miles.

With a high subsonic cruise speed of 600 m.p.h. the lifting component of the jet velocity comes out at 240 ft. per sec., and the horizontal, or propulsive component is about 930 ft. per sec. Using the same engine for take off as for cruise, these figures are compatible with a lifting jet velocity in vertical take-off of about 300 ft. per sec., a value which is likely to be acceptable for city-centre operations.

In principle, the invention is equally applicable to subsonic and supersonic aircraft. Although the shape of the aircraft does not at first sight appear efficient for supersonic flight, it should be borne in mind that in calculating the wave drag, the cross-sectional area of the jets must be taken into account, and therefore the effective variation of body area is not what it might appear to be. The effect of the jets is to reduce the wave drag.

For a supersonic aircraft, the air intake geometry must be appropriate, and spillage drag must be allowed for or considered in the design of the air intake. For flight speeds over Mach 1.7, a variable geometry intake is required.

It will be appreciated that many modifications and variations may be made to the embodiments of the invention that have been described without departing from the scope of the invention. Thus for example, the air intake of the aircraft need not be at the front end as shown, but side intakes can be used provided they are very high efficiency intakes. Furthermore control of all the jet deflecting vanes may take place through a control unit design to maintain the stability of the aircraft.

I claim:

1. In a free-flying jet lift vertical take-off aircraft having an aerodynamic shape designed for forward high speed flight, and for providing substantial aerodynamic lift during such forward high speed flight efficiently without giving rise to excessive drag on the aircraft, two jet discharge outlets having elongated transverse cross-sections which extend substantially parallel to the longitudinal axis of the aircraft and which are longer than half the length of the aircraft, said jet discharge outlets being laterally spaced apart and being located below the transverse horizontal median plane of the aircraft and adjacent the underside thereof, so as to bound a substantial area of the underside of the aircraft, means for directing jet gases through each of said jet discharge outlets so that the jet gases emerge from said jet discharge outlets in the form of a pair of downwardly directed sheet-like jets which are unbroken along their lengths, the jets together being capable of supporting the aircraft at a substantial height above the ground in free air, and forming lateral boundaries of said substantial area of the underside of the aircraft and inhibiting flow of ambient air laterally and upwardly from said area round the aircraft, whereby the jets provide jet lift for the aircraft, and increase the aerodynamic lift acting on the aircraft when the latter moves forwardly through ambient air at a relatively upwardly inclined angle of incidence, so as to give efficient forward high speed flight of the aircraft.

2. An aircraft as claimed in claim 1 in which said jet discharge outlets are adjustable for varying the direction of emergence of the jets therefrom.

3. An aircraft as claimed in claim 1 in which said jet discharge outlets are adjustable for varying the width of each jet.

4. An aircraft as claimed in claim 1 in which said jet discharge outlets are the sole outlets provided on the aircraft for the downward discharge of jet gases.

5. An aircraft as claimed in claim 1 in which said means for directing jet gases through each of said jet discharge outlets comprises means for producing a relatively small flow of exhaust gases in which fuel has been burned, means for producing a relatively large flow of air, means for mixing the flow of exhaust gases and the flow of air together, and duct means for leading the mixed gases to said jet discharge outlets.

6. An aircraft as claimed in claim 1 in which the jet discharge outlets extend below the underside of the aircraft and have inner longitudinal walls which are laterally spaced apart from one another and define therebetween an inverted channel opening vertically downwards, said inverted channel having open forward and rear ends so that during forward flight, the aircraft slipstream flows smoothly along and through said channel.

7. In a wingless free-flying jet lift vertical take-off aircraft: an elongated fuselage having an aerodynamic shape designed for forward high speed flight and for providing substantial aerodynamic lift during such forward high speed flight efficiently without giving rise to excessive drag on the aircraft, two jet discharge outlets having elongated transverse cross-sections which extend substantially parallel to the longitudinal axis of the aircraft and which are longer than half the length of the aircraft, said jet discharge outlets being laterally spaced apart on the port and starboard sides of said fuselage, and being located below the transverse horizontal median plane of the aircraft and adjacent the underside thereof, so as to bound a substantial area of the underside of the aircraft, a forward-looking air intake, air impeller means mounted in said air intake and producing a relatively large flow of air, gas turbine engine means producing a relatively small flow of exhaust gases in which fuel has been burned, one-way coupling means interconnecting the gas turbine engine means to said air impeller means, said coupling means transmitting drive from the gas turbine engine means to said air impeller means, and allowing said air impeller means to windmill in the event of failure of the gas turbine engine means, means for mixing flow of air and the flow of exhaust gases together, and duct means for directing the mixed gases through each of said jet discharge outlets, so that the jet gases emerge from said jet discharge outlets in the form of a pair of downwardly directed sheet-like jets which are unbroken along their lengths, the jets together being capable of supporting the aircraft at a substantial height above the ground in free air, and forming lateral boundaries of said substantial area of the underside of the aircraft and inhibiting flow of ambient air laterally and upwardly from said area round the aircraft, whereby the jets provide jet lift for the aircraft, and increase the aero-dynamic lift acting on the aircraft when the latter moves forwardly through ambient air at a relativtly upwardly inclined angle of incidence, so as to give efficient forward high speed flight of the aircraft.

8. In a free-flying jet lift vertical take-off aircraft: an elongated cigar-shaped fuselage of generally circular transverse cross section designed for forward high speed flight, and for providing substantial aerodynamic lift during such forward high speed flight efficiently without giving rise to excessive drag on the aircraft, a pair of spaced longitudinal walls at each of the port and starboard sides of the fuselage, and extending downwardly from the underside of the fuselage below the transverse horizontal median plane thereof, said walls extending parallel to the longitudinal axis of the fuselage and being longer than half the length of the aircraft, and the inner ones of said walls being laterally spaced apart from one another and defining therebetween an inverted channel opening vertically downwards and comprising a substantial area of the underside of the aircraft, said inverted channel having open forward and rear ends so that during forward flight, the fuselage slipstream flows smoothly along said channel, said each pair of walls defining a jet discharge outlet, means being provided for directing jet gases through each of said jet discharge outlets so that the jet gases emerge from said discharge outlets in the form of a pair of downwardly directed sheet-like jets which are unbroken along their lengths, the jets together being capable of supporting the aircraft at a substantial height above the ground in free air, and forming lateral boundaries of said inverted channel and inhibiting flow of ambient laterally and upwardly from said channel round the fuselage, whereby the jets provide jet lift for the aircraft, and increase the aerodynamic lift acting on the aircraft when the latter moves forwardly through ambient air at a relatively upwardly inclined angle of incidence, so as to give efficient forward high speed flight of the aircraft.

9. An aircraft as claimed in claim 8 in which said jet discharge outlets open below the lowest level of the fuselage.

10. An aircraft as claimed in claim 8 in which each jet discharge outlet includes a longitudinal dividing wall disposed intermediate and spaced from said pair of walls thereof, said dividing wall defining two longitudinal passageways on opposite sides thereof in the jet discharge outlet, means being provided for selectively opening and closing one of said passageways of each jet discharge outlet so that the effective widths of the jet discharge outlets can be varied.

References Cited in the file of this patent

UNITED STATES PATENTS

| 2,420,323 | Meyer | May 13, 1947 |
| 2,444,318 | Warner | June 29, 1948 |
| 2,860,713 | Peterson | Nov. 18, 1958 |

FOREIGN PATENTS

| 219,133 | Australia | Jan. 8, 1959 |
| 232,436 | Australia | Dec. 3, 1959 |
| 581,242 | Italy | Aug. 23, 1958 |
| 1,199,406 | France | June 22, 1959 |